(12) United States Patent
Van Wiggeren

(10) Patent No.: US 6,900,895 B2
(45) Date of Patent: May 31, 2005

(54) PHASE NOISE COMPENSATION IN AN INTERFEROMETRIC SYSTEM

(75) Inventor: Gregory D. Van Wiggeren, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 585 days.

(21) Appl. No.: 10/006,490

(22) Filed: Dec. 6, 2001

(65) Prior Publication Data

US 2003/0107743 A1 Jun. 12, 2003

(51) Int. Cl.$^7$ ............................ G01B 9/02; G01B 11/24; G01B 11/14; G01N 21/00; G01R 29/26
(52) U.S. Cl. ...................... 356/477; 356/73.1; 356/613; 356/479; 356/484; 356/486; 356/617; 324/613; 324/617
(58) Field of Search ............................ 356/73.1, 477, 356/479, 484, 486; 324/613, 617

(56) References Cited

U.S. PATENT DOCUMENTS

| | | | | |
|---|---|---|---|---|
| 4,918,373 A | * | 4/1990 | Newberg | |
| 4,984,884 A | * | 1/1991 | Ryu et al. | |
| 5,068,864 A | * | 11/1991 | Javan | |
| 5,390,017 A | * | 2/1995 | Ozeki et al. | |
| 5,608,331 A | * | 3/1997 | Newberg et al. | |
| 5,721,615 A | * | 2/1998 | McBride et al. | |
| 5,956,355 A | * | 9/1999 | Swanson et al. | |
| 6,008,487 A | | 12/1999 | Tachikawa et al. | |
| 6,181,429 B1 | | 1/2001 | Barberis et al. | |
| 6,211,663 B1 | * | 4/2001 | Moulthrop et al. | 324/76.23 |
| 6,323,950 B1 | * | 11/2001 | Kim et al. | |
| 6,486,961 B1 | * | 11/2002 | Szfraniec et al. | |
| 6,501,551 B1 | * | 12/2002 | Tearney et al. | |
| 6,570,458 B2 | * | 5/2003 | Cuddy | 331/37 |
| 6,594,595 B2 | * | 7/2003 | Yamaguchi et al. | |
| 6,606,158 B2 | * | 8/2003 | Rosenfeldt | |
| 6,606,583 B1 | * | 8/2003 | Sternberg et al. | |

OTHER PUBLICATIONS

Tinto, Massimo and Armstrong, John "Cancellation of Laser Noise in an Unequal–Arm Interferometer," http://www.nasatech.com/Briefs/Mar00/NPO2061.html.

* cited by examiner

Primary Examiner—Gregory J. Toatley, Jr.
Assistant Examiner—Khaled Brown

(57) ABSTRACT

Phase noise is at least partially cancelled for an interferometric system by using a delay/phase cross-correlation approach for two interferometers within the system. The cross-correlation approach may be used in measuring group delay of a device under test and includes determining the differences between the phase of the output of each interferometer at time t and the phase of the same output at the time t minus the delay of the other interferometer. In one embodiment, the first phase difference is the difference between the phase of a test interferometer output at time t and the phase of the test interferometer output at the time t offset by the known delay of a reference interferometer. The second phase difference is calculated using the same technique, but the time offset is a delay representative of the relative delay of two light propagations within the test interferometer. A noise-cancelled time series output that is indicative of group delay can then be generated by determining the difference between the first and second differences.

18 Claims, 2 Drawing Sheets

PHASE NOISE COMPENSATION IN AN INTERFEROMETRIC SYSTEM

TECHNICAL FIELD

The invention relates generally to obtaining measurements for optical characteristics of a device under test and more particularly to canceling phase noise from measurements of group delay introduced by the device under test.

BACKGROUND ART

Techniques for testing or analyzing optical components are known. A "device" under test (DUT), such as a length of fiber optic cable, may be carefully tested for faults or may be analyzed to determine whether the device is suitable for use in a particular application. System components such as multiplexers, demultiplexers, cross connectors, and devices having fiber Bragg gratings may be separately tested before a system is assembled.

Optical testing may be performed using a heterodyne optical network analyzer. Such analyzers may be employed for measuring properties of optical components, such as group delay. "Group delay" is sometimes referred to as envelope delay, since it refers to the frequency-dependent delay of an envelope of frequencies, with the group delay for a particular frequency being the negative of the slope of the phase curve at that frequency. Typically, a heterodyne optical network analyzer includes two interferometers. An example of a heterodyne optical network analyzer 10 having two interferometers 12 and 14 is shown in FIG. 1. A tunable laser source (TLS) 16 generates a laser light beam that is split by a coupler 18. The TLS is continuously tuned, or swept, between a start frequency and a stop frequency. By operation of the coupler 18, a first portion of the coherent light from the TLS is directed to the DUT interferometer 12, while a second portion is directed to the reference interferometer 14.

The DUT interferometer 12 has a second coupler 22 that allows beam splitting between a first arm 24 and a second arm 26. A mirror 28 is located at the end of the first arm and a DUT 20 is located near the reflective end of the second arm. The lengths of the two arms can differ, and the difference in the optical path length is represented in FIG. 1 by $L_{DUT}$. Since the DUT can be dispersive, the actual optical path length is a function of frequency. A detector 30 is positioned to measure the combination of the light reflected by the mirror 28 and the light reflected at the DUT 20. Processing capability (not shown) is connected to the detector 30 to measure group delay of the DUT as a function of frequency. However, in order to very precisely measure the group delay, it is necessary to obtain knowledge of the frequency tuning of the TLS 16 as a function of time. The reference interferometer 14 is used for this purpose.

The structure of the reference interferometer 14 is similar to that of the DUT interferometer 12, but a mirror 32 takes the place of the DUT 20. A second detector 34 receives light energy that is reflected by the combination of the mirror 32 at the end of a third arm 36 and a mirror 38 at the end of a fourth arm 40. As in the DUT interferometer, the lengths of these two arms can be different, and this difference in lengths is represented by $L_{REF}$. The optical characteristics of the reference interferometer are fixed and known.

A potential problem occurs in the heterodyne optical network analyzer 10 when the path length difference ($L_{DUT}$) is sufficiently large that coherence effects become an issue. The frequency generated by the TLS 16 undesirably fluctuates in a random manner around its target frequency as it is tuned. The random fluctuations occur as a result of various quantum or stochastic effects. The random fluctuations of the frequency affect the frequency of the heterodyne interference signal measured by each detector 30 and 34. When the group delay of the DUT 20 is calculated, the frequency fluctuations of the TLS 16 manifest themselves as noise in the group delay measurement. This ultimately limits the precision of the measurement process. This effect is referred to as "phase noise." The phase noise on the measurement process increases as the path length mismatch for the two arms 24 and 26 of the DUT interferometer 12 increases, until the path length mismatch equals or exceeds the coherence length of the laser beam.

What is needed is a method and system for at least reducing the deleterious effects of phase noise in an interferometric system.

SUMMARY OF THE INVENTION

A reduction in the effects of phase noise introduced into an interferometric system is achieved by using a reference interferometer to "measure" the effects. A coherent light beam having both intentional frequency variations and undesired frequency fluctuations is divided into separate beam portions which are directed to the reference interferometer and a test interferometer. The reference interferometer has known optical delay characteristics and the test interferometer has known or estimated optical delay characteristics, allowing a delay/phase cross-correlation for each of the two interferometers. That is, delay information regarding one of the interferometers is used with phase information acquired from the other interferometer in the cancellation of phase noise effects. Typically, the method is used to eliminate the adverse effects of the phase noise within the test interferometer, but embodiments are contemplated in which the approach is used to offset phase noise effects in other components, such as a separate optical system in which a third portion of the coherent light beam is directed for other purposes.

The intentional variation of the light beam frequency is provided by operation of a tuned laser source that continuously sweeps through a frequency range. On the other hand, the undesired frequency fluctuations are random and occur as a result of quantum or other stochastic effects in the generation or manipulation of the light beam. These random fluctuations produce the phase noise effects.

In one embodiment, the cross-correlation approach includes determining the differences between the phase at the output of each interferometer at time t and the phase at the same output at the time t minus the delay of the other interferometer. That is, for each time t in a time series, a first phase difference is determined for the test interferometer and a second phase difference is determined for the reference interferometer. The first phase difference is the difference between the phase of the test output at the time t and the phase at the test output at the time t offset by the known delay of the reference interferometer. The second phase difference is the difference between the phase at the reference interferometer output at time t and the phase at the reference interferometer output at time t offset by a delay representative of the delay of the test interferometer. The representative delay may be a calculation of the mean of the delay, as determined using other techniques. Within this embodiment, the time series may be formed by determining the difference between the first and second difference. This double-difference technique provides an isolation of the random phase noise introduced by operation of the light beam source.

Typically, but not critically, the test interferometer includes a device under test (DUT) for which group delay is being measured. Thus, the phase noise is used to reduce or eliminate the adverse effects of such noise in the calculation of DUT group delay. The value of mean delay that is used in the determination of the second phase difference may be obtained using known techniques, such as optical frequency domain reflectometry (OFDR) or optical coherence domain reflectometry (OCDR).

An advantage of the invention is that more reliable determinations of the optical characteristics of a DUT can be achieved. Heterodyne optical network analyzers operate by splitting and then recombining a coherent light beam. When the split beams are recombined, the random frequency fluctuations of phase noise limit the precision of the measurement procedure. Thus, for a laser having a 100 kHz linewidth, the phase noise can be a limiting factor in measurement precision with only a few meters of delay introduced by a DUT in the interferometer. It follows that phase noise renders measurements of group delay and group velocity dispersion for particularly long DUTs, such as 10 km lengths of fiber, necessarily unreliable. However, the phase noise reduction of the invention allows high-delay devices to be analyzed.

DETAILED DESCRIPTION

Figure 2:
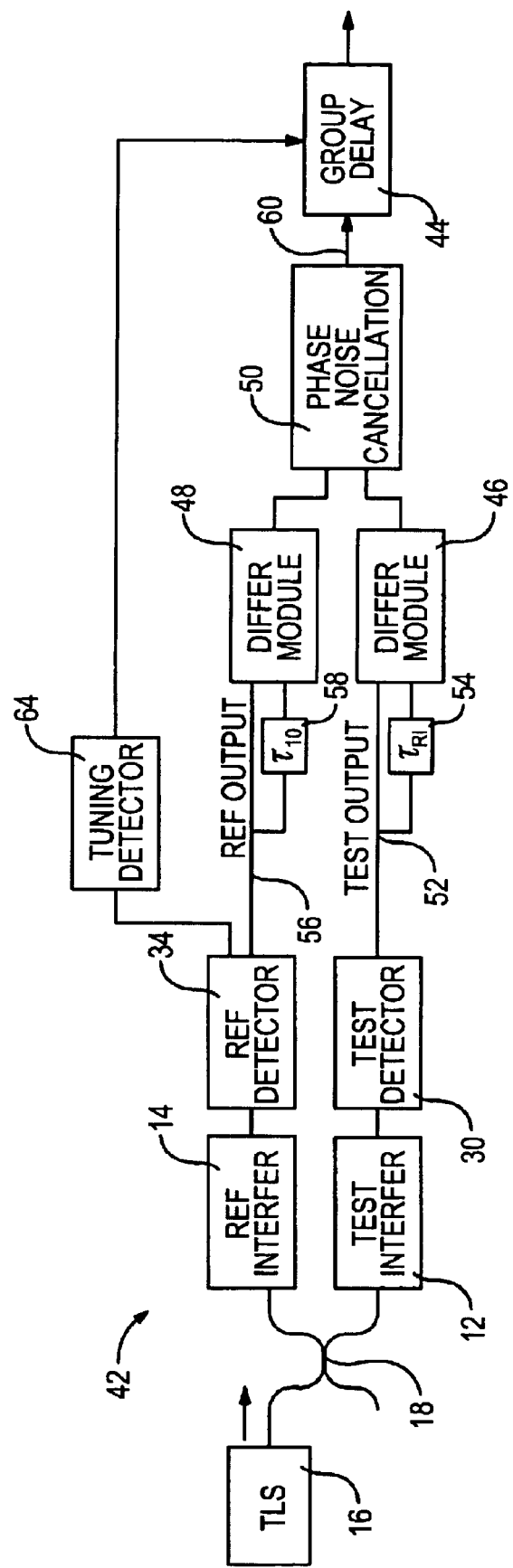
FIG. 2 is a block diagram of a system for controlling phase noise in the analyzation of optical characteristics of a device under test, in accordance with the invention.

With reference to FIG. 2, a heterodyne optical network analyzer 42 having phase noise cancellation is shown as being used for measurements of group delay, as indicated by a group delay module 44. However, the analyzer may be used for other measurements relevant to optical characteristics of a device under test (DUT), such as measurements of group velocity, transmissivity, reflectivity and chromatic dispersion. Moreover, the phase noise cancellation may be quantified using the techniques to be described below, but the quantifications may be applied in other systems in which beam portions are separately conducted for comparison purposes.

Figure 1:
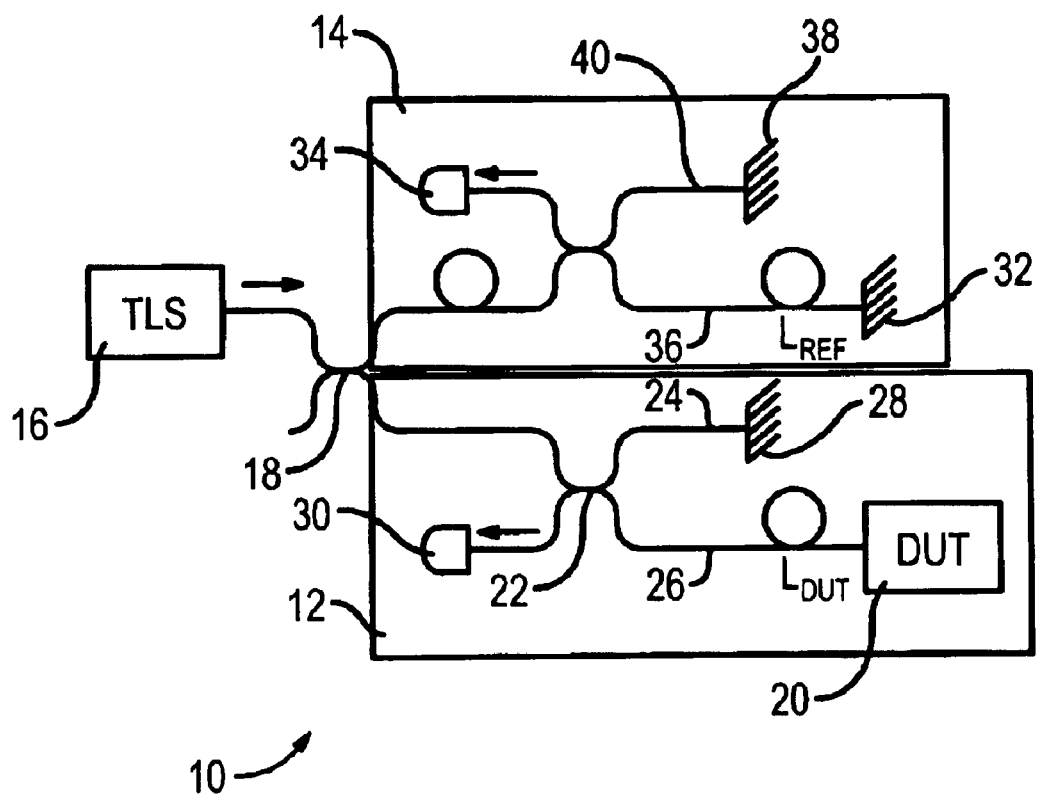
FIG. 1 is a block diagram of a heterodyne optical network analyzer which may be used in measuring optical characteristics of a device under test.

The analyzer 42 is shown as including components that are the functional equivalents of components of FIG. 1. The coherent light beam that is generated by the TLS 16 is split by a coupler 18 into beam portions that are separately directed to the test interferometer 12 and the reference interferometer 14. The interferometers 12 and 14 may be structurally identical to the ones shown in FIG. 1, but the detectors 30 and 34 are shown as being separated from the interferometers in FIG. 2. The interferometers of FIG. 2 need not be identical to the interferometers of FIG. 1. In addition to the conventional Michelson and Mach-Zehnder configurations, the invention may be used with other interferometer architectures.

In the embodiment of FIG. 2, the test interferometer 12 includes the capability of being attached to a DUT. For example, the DUT may be a length of fiber, a multiplexer, a demultiplexer, or a cross connector. The optical characteristics of the DUT will affect the characteristics of the light that reaches the test detector. However, there may be embodiments in which the optical characteristics of the test interferometer remain fixed, in the same manner as the reference interferometer 14.

As is known in the art, the TLS 16 generates swept-frequency light that is split by the coupler 18 and directed into the two interferometers 12 and 14. Each detector 30 and 34 may be a photoreceiver that measures an intensity I as a function of time t, where $$I(t) = I_{arm1} + I_{arm2} + 2(I_{arm1}I_{arm2} \cos \Phi(t))$$ Eq. 1

That is, the measured intensity is a function of the intensities of the light from the two arms and is a function of the phase of the light at time t. For group delay measurements, $\Phi(t)$ is an important component of Eq. 1.

The phase $\Phi_{TI}(t)$ measured by the test interferometer 12 at time t is $$\Phi_{TI}(t) = 2\pi\left[\nu_0 + \gamma t - \frac{\gamma}{2}\tau_{TI} + \chi\left(t - \frac{\tau_{TI}}{2}\right)\right]\tau_{TI} +$$ Eq. 2
$$\phi(t) - \phi(t - \tau_{TI})$$
$$= \omega\left(t - \frac{\tau_{TI}}{2}\right)\tau_{TI} + \phi(t) - \phi(t - \tau_{TI})$$
$$= \omega_{TI}\tau_{TI} + \phi(t) - \phi(t - \tau_{TI})$$

where the subscript "TI" indicates that the variable is associated with the test interferometer, $\omega(t)$ is the radian frequency produced by the TLS 16, $\nu_O$ is the initial frequency of the swept laser light, $\gamma$ is the rate of the linear sweep in units of Hz/second, $\chi(t)$ represents the nonlinear components of the frequency sweep, $\phi(t)$ represents the random phase evolution associated with the finite coherence of the TLS 16, and $\tau_{TI}$ is the delay introduced by the DUT. For a dispersive DUT, $\tau_{TI}$ can vary with frequency. In fact, the optical path length mismatch, $L_{DUT}$, is proportional to $\tau_{TI}$. The reference interferometer has no dispersive elements, and consequently, the corresponding delay in the reference interferometer, 96 $_{RI}$, is assumed to be constant. By analogy to Eq. 2, the phase of the reference interferometer, $\Phi_{RI}$, at time t can be determined to be $$\Phi_{RI}(t) = \omega_{RI}\tau_{RI} + \phi(t) - \phi(t - \tau_{RI})$$ Eq. 2.1 where "RI" indicates that the variable is associated with the reference interferometer. The optical radian frequency $\omega(t)$ produced by the TLS is swept in time and can be written as $$\omega(t) = 2\pi[\nu_0 + \gamma t + \chi(t)]$$ Eq. 3

At least with regard to this description of the invention, the TLS 16 is modeled as a quasi-monochromatic light source, where the light waves E generated by the TLS satisfy $$E(t) = E_o e^{i\omega(t)t + \phi(t)}$$ Eq. 4

When the random phase evolution ($\phi$) at time t is approximately the same as the random phase evolution at the time t offset by $\tau_{TI}$ (as will occur when $\tau_{TI}$ is very short compared to the coherence time of the TLS), the group delay $\tau_g$ of the device under test can be obtained from $$\tau_g \equiv \frac{d\Phi_{TI}}{d\omega} = \frac{\frac{d\Phi_{TI}}{dt}}{\frac{d\omega_{TI}}{dt}} = \tau_{TI} + \omega_{TI}\frac{\partial \tau_{TI}}{\partial \omega_{TI}}$$ Eq. 5

However, when $\tau_{TI}$ becomes larger, the phase noise terms begin to induce significant errors that ultimately are so large as to render the measurement of the group delay unreliable.

Therefore, the invention uses the reference interferometer 14 to "measure" the phase noise to allow cancellation of its effects. In FIG. 2, a first differencing module 46, a second differencing module 48, and a phase noise cancellation module 50 are used to enable phase noise cancellation for the measurements that occur at the group delay module 44. Typically, the operations of these modules are executed in programming (software modules), but specific hardware circuitry can be dedicated to enabling the operations. That is, the term "module" should be interpreted herein as including programming, circuitry or a combination of programming and circuitry. The differencing modules and the phase noise cancellation module cooperate to provide a double-difference time series Z(t) where $$Z(t) = \Phi_{TI}(t) - \Phi_{TI}(t-\tau_{RI}) - [\Phi_{RI}(t) - \Phi_{RI}(t-\tau_{10})] \quad \text{Eq. 6}$$

In Eq. 6, the first phase measure ($\Phi_{TI}(t)$) is determined from the test output 52, while the second phase measurement is the phase at time t offset by the delay imposed within the reference interferometer 14. This offset delay is represented by component 54 in FIG. 2. The third measure of phase within Eq. 6 is determined from the reference output 56 from the detector 34, while the last phase measurement is the phase with the additional offset $\tau_{10}$. As will be explained more fully immediately below, the offset, $\tau_{10}$, is based upon an approximation of the delay of the test interferometer (e.g., the mean of $\tau_{TI}$.) In FIG. 2, the delay offset component 58 is used by the second differencing module 48 to generate the fourth phase measurement. In its simplest form, the phase noise cancellation component 50 merely determines the difference between the two phase differences computed by the modules 46 and 48. That is, the phase noise cancellation component 50 generates the double-difference time series Z(t) of Eq. 6.

The offset delay, $\tau_{10}$, imposed by the component 58 represents the delay at the test interferometer 12. The imposed offset may be a constant that is assumed to be approximately equal to the mean of the test interferometer delay. For optimal results, the offset should be sufficiently close to the test interferometer delay such that for all of the measured frequencies, $\omega(t-\tau_{TI}) - \omega(t-\tau_{10}) \cong 0$. The value for the offset can be obtained using known techniques, such as those used in OTDR or OFDR. Rather than a constant, the offset may vary with laser beam frequency, so that, like the actual test interferometer delay, the offset is a function of frequency (which is a function of time during the sweep of the TLS 16 through the frequency range).

The first of the four phase measures of Eq. 6 can be replaced with Eq. 2. Similarly, the third phase measure can be replaced with Eq. 2.1, as can the phase measures having the offsets, yielding the time series, Z(t) as $$\underbrace{(\omega_{TI}\tau_{TI} + \phi(t) - \phi(t-\tau_{TI})) -}_{\Phi_{TI}(t)} \quad \text{Eq. 7}$$

$$\underbrace{((\omega_{TI}(t-\tau_{RI}))(\tau_{TI}(t-\tau_{RI})) + \phi(t-\tau_{RI}) - \phi(t-\tau_{TI}-\tau_{RI})) -}_{\Phi_{TI}(t-\tau_{RI})}$$

$$\underbrace{[(\omega_{RI}\tau_{RI} + \phi(t) - \phi(t-\tau_{RI})) -}_{\Phi_{RI}(t)}$$

$$\underbrace{((\omega_{RI}(t-\tau_{10}))\tau_{RI} + \phi(t-\tau_{10}) - \phi(t-\tau_{10}-\tau_{RI}))]}_{\Phi_{RI}(t-\tau_{TI})}$$

Assuming that $\phi(t-\tau_{TI})$ is approximately equal to $\phi(t-\tau_{10})$, the phase noise components in Eq. 7 cancel. Consequently, $$Z(t) = \omega_{TI}\tau_{TI} - (\omega_{TI}(t-\tau_{RI}))(\tau_{TI}(t-\tau_{RI})) - [\omega_{RI}\tau_{RI} - \omega_{RI}(t-\tau_{10})\tau_{RI}] \quad \text{Eq. 8}$$

In Eq. 2, since $$\omega\left(t - \frac{\tau_{TI}}{2}\right)$$

is generally equal to $\omega_{TI}$, $$Z(t) = \quad \text{Eq. 9}$$

$$\omega\left(t - \frac{\tau_{TI}}{2}\right)\tau_{TI} - \left(\omega\left(t-\tau_{RI}-\frac{\tau_{TI}}{2}\right)\right)(\tau_{TI}(t-\tau_{RI})) - \left[\omega\left(t-\frac{\tau_{RI}}{2}\right)\tau_{RI} - \omega\left(t-\tau_{10}-\frac{\tau_{RI}}{2}\right)\tau_{RI}\right]$$

In addition to the output 60 of the phase noise cancellation module 50, the group delay module 44 receives an output 62 of a tuning detector 64. The tuning detector 64 is a module which is conventional to heterodyne optical network analyzers and is used to detect the frequency sweep of the TLS 16. The operations of the tuning detector 64 and the group delay module 44 are most likely carried out in software. That is, the operations are not executed using circuitry that is separate from other components of the system 42 of FIG. 2. There are a number of approximations that may be used to simplify Eq. 9 in the group delay module 44 of FIG. 2.

The simplification approximations are appropriate when 6 changes linearly on time scales of $\tau_{RI}$ or $\tau_{TI}$. A first appropriate approximation is $$\omega\left(t - \tau_{RI} - \frac{\tau_{TI}}{2}\right) = \omega\left(t - \frac{\tau_{RI}}{2}\right) - \left(\frac{\tau_{RI}}{2} + \frac{\tau_{TI}}{2}\right)\frac{\partial \omega}{\partial t}\left(t - \frac{\tau_{RI}}{2}\right) \quad \text{Eq. 10}$$

Another simplification is $$\tau_{TI}(t-\tau_{RI}) = \tau_{TI}\left(t - \frac{\tau_{RI}}{2}\right) - \frac{\tau_{RI}}{2}\frac{\partial \tau_{TI}}{\partial t}\left(t - \frac{\tau_{RI}}{2}\right) \quad \text{Eq. 11}$$

Using the approximations of Eqs. 10 and 11, we see $$Z(t) = \tau_{RI}\left\{\frac{\partial \omega\left(t - \frac{\tau_{RI}}{2}\right)}{\partial t}\left[\tau_{TI}\left(t - \frac{\tau_{RI}}{2}\right) - \tau_{10} - \frac{\tau_{TI}}{2}\frac{\partial \tau_{TI}\left(t - \frac{\tau_{RI}}{2}\right)}{\partial t}\right] + \omega\left(t - \frac{\tau_{RI}}{2}\right)\frac{\partial \tau_{TI}\left(t - \frac{\tau_{RI}}{2}\right)}{\partial t}\right\} \quad \text{Eq. 12}$$

Referring to the third phase measure $\Phi_{RI}(t)$ in Eq. 7, it can then be determined that $$\frac{d\Phi_{RI}(t)}{dt} = \frac{\partial \omega\left(t - \frac{\tau_{RI}}{2}\right)}{\partial t}\tau_{RI} \quad \text{Eq. 13}$$

With this information, the group delay ($\tau_g$) can be recovered from $$\frac{Z(t)}{\frac{d\Phi_{RI}}{dt}} = \tau_{TI}\left(t - \frac{\tau_{RI}}{2}\right) - \tau_{10} - \quad \text{Eq. 14}$$

$$\frac{\tau_{TI}}{2}\frac{\partial \omega}{\partial t}\left(t - \frac{\tau_{RI}}{2}\right)\frac{\partial \tau_{TI}}{\partial \omega}\left(t - \frac{\tau_{RI}}{2}\right) + \omega\left(t - \frac{\tau_{RI}}{2}\right)\frac{\partial \tau_{TI}}{\partial \omega}\left(\frac{t - \tau_{RI}}{2}\right)$$

-continued $$= \tau_g\left(t - \frac{\tau_{RI}}{2}\right) - \tau_{10}$$

The group delay recovery is possible since the term $$\frac{\tau_{TI}}{2}\frac{\partial \omega}{\partial t}\left(t - \frac{\tau_{RI}}{2}\right)$$

has been determined to be so small that the portion of the equation in which it is a multiplicand can be disregarded without significantly affecting the process. Moreover, since only the relative group delay is typically of importance, the constant term, $\tau_{10}$, does not interfere with the measurement, so that it can be disregarded or numerically removed.

From the foregoing it is also possible to determine the relationship between $\omega$ and t. With this relationship, a resampling of $$\tau_g\left(t - \frac{\tau_{RI}}{2}\right)$$

results in $$\tau_g\left(\omega\left(t - \frac{\tau_{RI}}{2}\right)\right) \qquad \text{Eq. 15}$$

Using these techniques, the group delay can be recovered substantially independently of any adverse effects of phase noise introduced by the TLS 16 of FIG. 2. The technique may be used to measure group delay and/or group velocity dispersion of devices under test, where phase noise would otherwise be a problem, such as in the testing of fibers having lengths longer than 1 km. The phase noise cancellation by using the two interferometers may also be used in other applications.

What is claimed is:

1. A method of reducing phase noise detected using an interferometric system comprising the steps of:
   generating a light beam having a frequency that is intentionally varied as a function of time and that includes undesired frequency fluctuations, said undesired frequency fluctuations being phase noise;
   directing a first beam portion of said light beam to a reference interferometer, said reference interferometer having known optical characteristics;
   directing a second beam portion of said light beam to a test interferometer;
   detecting optical outputs for each of said reference and test interferometers;
   determining phase information regarding each of said optical outputs; and
   using said phase information that is specific to said reference interferometer in combination with delay information that is specific to said test interferometer and using said phase information that is specific to said test interferometer in combination with delay information that is specific to said reference interferometer to at least partially cancel said phase noise.

2. The method of claim 1 wherein using said phase information and said delay information includes calculating characteristics of a device under test, where said device under test is connected to said test interferometer.

3. The method of claim 1 wherein using said phase and delay information includes determining for each time (t) in a time series:

an indication of a difference in a phase of said optical output of said test interferometer at said time t and a phase of said optical output of said test interferometer at a time offset from said time t by a known optical delay introduced within said reference interferometer; and an indication of a difference in a phase of said optical output of said reference interferometer at said time t and a phase of said optical output of said reference interferometer at a time offset from said time t by a time that is representative of a delay introduced within said test interferometer by a device under test (DUT).

4. The method of claim 3 wherein generating said time series includes determining a difference between said indications of said differences for each said time t.

5. The method of claim 4 wherein using said phase and delay information includes determining group delay associated with said DUT, said group delay being determined following said steps of determining said indications of differences.

6. The method of claim 1 wherein generating said light beam includes activating a laser source in a sweep frequency mode.

7. The method of claim 1 wherein said directing steps include coupling said first and second beam portions to reference and test interferometers that define a heterodyne optical network analyzer.

8. An interferometric system comprising:
   a source of coherent light configured to vary the frequency of said coherent light within a range, said source being susceptible to irregular frequency variations;
   a reference interferometer coupled to said source to receive a reference beam portion of said coherent light, said reference interferometer having a known delay;
   a reference detector optically coupled to said reference interferometer to generate a reference output signal representative of light received from said reference interferometer;
   a test interferometer coupled to said source to receive a measurement beam portion of said coherent light, said test interferometer being configured for optical coupling to a device under test (DUT) with a delay that is susceptible to variations with said frequency;
   a test detector optically coupled to said test interferometer to generate a test output signal representative of light received from said test interferometer; and
   a processor configured to at least partially offset effects of said irregular frequency variations in an analysis of said DUT, said processor being enabled to identify optical characteristics of said DUT following imposing said delay of said DUT on said reference output signal and imposing said known delay on said test output signal;
   wherein said irregular frequency variations define phase noise with respect to said analysis of said DUT.

9. The system of claim 8 wherein said processor includes a first differencing module and a second differencing module, wherein
   said first differencing module has an input connected to receive said test output signal and has an output that is indicative of a difference in a phase of said test output signal as a function of time t and a phase of said test output signal as a function of time $t-\tau_{RI}$, where $\tau_{RI}$ is said known delay of said reference interferometer; and
   said second differencing module has an input connected to receive said reference output signal and has an output that is indicative of a difference in a phase of said reference output signal as a function of said time t and a phase of said reference output signal as a function of time $t-\tau_{10}$, where $\tau_{10}$ is representative of a delay of said test interferometer following said optical coupling to said DUT.

10. The system of claim 9 wherein said processor further includes a third differencing module connected to said first and second differencing modules and configured to generate a noise-cancelled signal that is indicative of a time series of DUT analysis as the difference between said outputs of said first and second differencing modules.

11. The system of claim 10 wherein said processor includes a module for applying said time series to determine a group delay that is specific to said DUT.

12. The system of claim 8 wherein said source of coherent light is a tunable laser source.

13. A method of reducing phase noise in an interferometric system comprising the steps of:

continuously sweeping a laser light beam through a frequency range, said laser light beam including said phase noise;

splitting said laser light beam between a reference heterodyne interferometer having a known delay and a test heterodyne interferometer having a group delay of interest;

generating a time series of analysis signal on a basis of outputs of said reference and test heterodyne interferometers, including for each time t within said time series:

(a) determining a first difference between a phase of a test output of said test heterodyne interferometer at said time t and a phase of said test output at said time t offset by said known delay; and (b) determining a second difference between a phase of a reference output of said reference heterodyne interferometer at said time t and a phase of said reference output at said time t offset by a delay representative of a delay of said test heterodyne interferometer; and using said time series to reduce effects of said phase noise in calculations of said group delay of interest.

14. The method of claim 13 wherein said step of determining said second difference includes offsetting said time t by a mean of an estimation of said delay of said test heterodyne interferometer.

15. The method of claim 14 wherein generating said time series further includes determining a difference between said first and second differences for each said time t.

16. The method of claim 13 further comprising the step of coupling a device under test (DUT) to said test heterodyne interferometer, said group delay of interest representing delay being introduced by said DUT.

17. The method of claim 16 wherein coupling said DUT includes connecting a length of fiber optic cabling under test.

18. The method of claim 13 wherein said step of splitting said laser light beam includes dividing a first beam portion into separate arms of said test heterodyne interferometer and includes dividing a second beam portion into separate arms of said reference heterodyne interferometer.

* * * * *

UNITED STATES PATENT AND TRADEMARK OFFICE
CERTIFICATE OF CORRECTION

PATENT NO. : 6,900,895 B2
DATED : May 31, 2005
INVENTOR(S) : Van Wiggeren

It is certified that error appears in the above-identified patent and that said Letters Patent is hereby corrected as shown below:

<u>Column 8,</u>
Line 54, after "signal" delete ";" and insert -- : --.

Signed and Sealed this

Twenty-first Day of February, 2006

JON W. DUDAS
*Director of the United States Patent and Trademark Office*